(12) United States Patent
Watanabe et al.

(10) Patent No.: US 10,379,459 B2
(45) Date of Patent: Aug. 13, 2019

(54) IMAGE FORMING DEVICE

(71) Applicant: KONICA MINOLTA, INC., Chiyoda-ku, Tokyo (JP)

(72) Inventors: Yoshikazu Watanabe, Toyohashi (JP); So Yano, Ibaraki (JP); Sotaro Yokota, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/945,873

(22) Filed: Apr. 5, 2018

(65) Prior Publication Data

US 2018/0314184 A1 Nov. 1, 2018

(30) Foreign Application Priority Data

Apr. 27, 2017 (JP) .................. 2017-087859

(51) Int. Cl.
*G03G 15/043* (2006.01)
*G03G 15/04* (2006.01)
(Continued)

(52) U.S. Cl.
CPC ....... *G03G 15/04054* (2013.01); *G03B 27/00* (2013.01); *G03G 15/011* (2013.01); (Continued)

(58) Field of Classification Search
CPC ........... G03G 15/04054; G03G 15/011; G03G 15/043; G03G 15/5004; G03G 2215/0409; G03B 27/00; B41J 2/45
See application file for complete search history.

(56) References Cited

U.S. PATENT DOCUMENTS 4,435,064 A * 3/1984 Tsukada .................. B41J 2/45
347/130
4,571,602 A * 2/1986 De Schamphelaere ....................
B41J 2/451
347/237

(Continued)

FOREIGN PATENT DOCUMENTS

JP 2006088588 A 4/2006
JP 2007125785 A 5/2007
JP 2016043518 A 4/2016

*Primary Examiner* — Yaovi M Ameh
(74) *Attorney, Agent, or Firm* — Buchanan Ingersoll & Rooney PC

(57) ABSTRACT

An image forming device includes: element arrays each including light emitting elements arranged in main scanning direction, the arrays being arranged in sub scanning direction; a photoreceptor whose surface moves relative to the light emitting elements in the sub scanning direction; a controller outputting control voltage instructing light emission amount for each light emitting element; and drivers each supplying drive current to a corresponding light emitting element according to the control voltage, thus causing the light emitting element to emit light to expose the moving surface of the photoreceptor. Intervals L between the arrays satisfy $(D/2) \times (V/F) - ((V/F) \times 0.1) \leq L \leq (D/2) \times (V/F) + ((V/F) \times 0.1)$ where F expresses frequency of AC noise to be superimposed on the control voltage, V expresses system speed of the surface of the photoreceptor moving relative to the light emitting elements, and D is an odd number.

6 Claims, 13 Drawing Sheets

(51) Int. Cl.
    *G03G 15/01*     (2006.01)
    *G03G 15/00*     (2006.01)
    *G03B 27/00*     (2006.01)
    *B41J 2/45*     (2006.01)

(52) U.S. Cl.
    CPC ....... *G03G 15/043* (2013.01); *G03G 15/5004* (2013.01); *B41J 2/45* (2013.01); *G03G 2215/0409* (2013.01)

(56) References Cited

U.S. PATENT DOCUMENTS

| 7,782,351 B2* | 8/2010 | Kurose | B41J 2/451 |
| | | | 347/238 |
| 2005/0117014 A1* | 6/2005 | Livne | B41J 2/45 |
| | | | 347/238 |

\* cited by examiner

Streak noise

After averaging

FIG. 9

| System speed V (mm/sec) | Noise frequency F (Hz) | D | | | | | |
|---|---|---|---|---|---|---|---|
| | | 7 | 9 | 13 | 19 | 39 | 17 |
| 100 | 2500 | 0.14 | 0.18 | 0.26 | 0.38 | 0.78 | 0.34 |
| 200 | 2436 | 0.29 | 0.37 | 0.53 | 0.78 | 1.60 | 0.70 |
| 300 | 2500 | 0.42 | 0.54 | 0.78 | 1.14 | 2.34 | 1.02 |
| 400 | 2308 | 0.61 | 0.78 | 1.13 | 1.65 | 3.38 | 1.47 |

L (mm)

OLED-PH relating to conventional art

IMAGE FORMING DEVICE

The entire disclosure of Japanese patent Application No. 2017-087859, filed on Apr. 27, 2017, is incorporated herein by reference in its entirety.

BACKGROUND

(1) Technological Field

The present invention relates to an image forming device, and particularly to an art of preventing easy visual recognition of density unevenness resulting from AC noise.

(2) Description of the Related Art

According to recent image forming devices employing an electronic photography system, attention is focused on organic light emitting diode print heads (OLED-PHs) reducible in size and cost, which serve as optical PHs for exposing photoreceptors to form electrostatic latent images. Also, with the increase in speed and density of electronic devices mounted on image forming devices, electromagnetic interference (EMI) inside the image forming devices has been a problem. OLED-PHs inside the image forming devices are also affected by the EMI.

In response to this problem, there has been proposed for example a spread spectrum clock generator (SSCG), which uses a spread spectrum system to vary slightly and oscillate a clock frequency of an electronic device that generates noise (see Japanese Patent Application Publication No. 2007-125785 and Japanese Patent Application Publication No. 2006-88588). The SSCG is used for varying an oscillation frequency of charging devices and/or developing devices such that frequency generated by electromagnetic wave radiation is dispersed. This suppresses the peak of the electromagnetic wave radiation by approximately 4 to 5 dB for example.

Moreover, there has been also proposed an image forming device that includes LEDs, which are arranged in a main scanning direction and classified into groups, and performs control such that an output cycle of drive signals, which control lighting the LEDs, differs for each LED group (see Japanese Patent Application Publication No. 2016-43518). With this configuration, it is possible to reduce an electromagnetic noise resulting from drive signals.

An image forming device includes charging devices, OLED-PHs, and developing devices that are disposed in proximity of each other along outer circumferential surfaces of photosensitive drums. Accordingly, the OLED-PHs are strongly affected by a high-frequency noise (referred to hereinafter as AC noise) generated by the charging devices and/or the developing devices.

Specifically, in an OLED-PH as shown in FIG. 14A, a control voltage Vdac, which is output by a controller 1401, is input via a control wiring 1402 to drivers 1404 corresponding one-to-one to OLEDs 1403, and the drivers 1404 supply a drive current Id to the OLEDs 1403 according to the control voltage Vdac to cause the OLEDs 1403 to emit light. A noise component resulting from AC noise is superimposed on the control voltage Vdac, the drive current Id varies according to the noise component, and thus a light emission amount of the OLEDs 1403 varies. This generates streak noise in an image (FIG. 14B).

Thus, the following problem occurs. Charging devices and/or developing devices, which are noise sources, need to be disposed in proximity of optical PHs for size reduction in image forming devices. For this reason, it is impossible to sufficiently suppress AC noise even by applying the above conventional art. As a result, streak noise remains.

SUMMARY

The present invention was made in view of the above problem, and aims to provide an image forming device capable of preventing easy visual recognition of image deterioration resulting from AC noise.

In order to achieve the above aim, the image forming device relating to at least one aspect of the present invention is an image forming device including: a plurality of element arrays that each consist of a plurality of light emitting elements arranged in a main scanning direction, the element arrays being arranged in a sub scanning direction; a photoreceptor whose surface moves relative to the light emitting elements in the sub scanning direction; a controller that outputs a control voltage instructing a light emission amount for each of the light emitting elements; and a plurality of drivers that correspond one-to-one with the light emitting elements, and each supply a drive current to a corresponding one of the light emitting elements according to the control voltage, thus causing the light emitting element to emit light to expose the moving surface of the photoreceptor, wherein array intervals L between the element arrays in the sub scanning direction satisfy $(D/2) \times (V/F) - ((V/F) \times 0.1) \leq L \leq (D/2) \times (V/F) + ((V/F) \times 0.1)$ ... (1) where F expresses frequency of an AC noise to be superimposed on the control voltage, V expresses a system speed that is a moving speed of the surface of the photoreceptor relative to the light emitting elements, and D is an odd number.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

In the drawings:

FIG. 9 is a table showing the array intervals L for each combination of the system speed V, the AC noise frequency F, and a double wave number D;

DETAILED DESCRIPTION OF EMBODIMENTS

Hereinafter, one or more embodiments of an image forming device relating to the present invention will be described with reference to the drawings. However, the scope of the invention is not limited to the disclosed embodiments.

[1] First Embodiment (1-1) Configuration of Image Forming Device

The following describes the configuration of an image forming device relating to a first embodiment.

Figure 1:
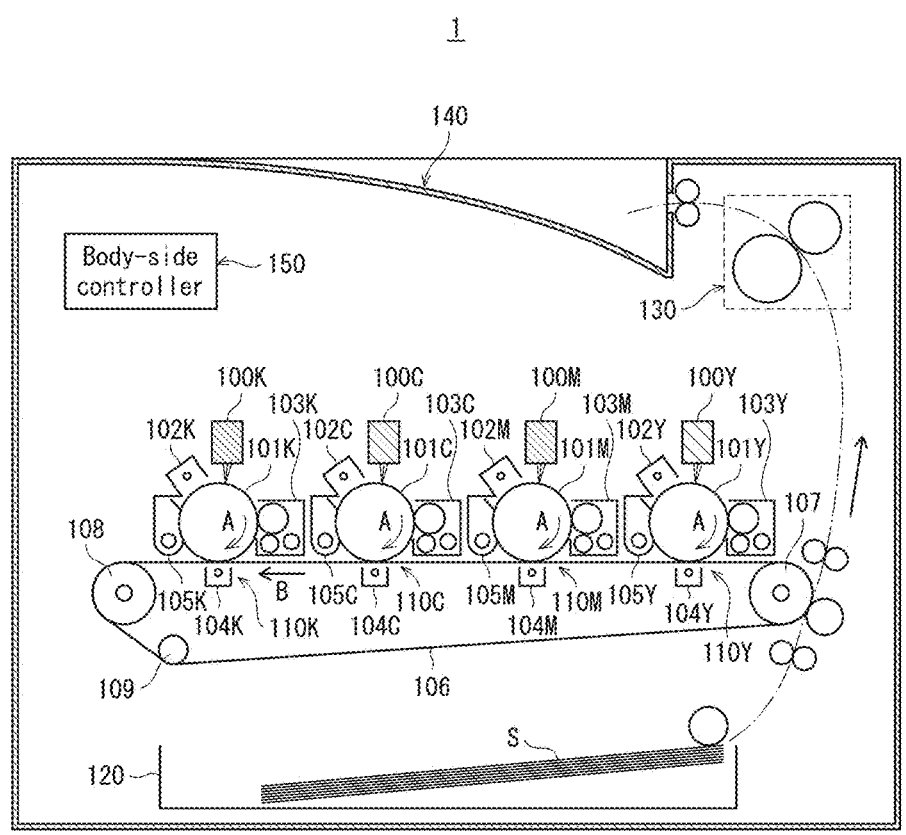
FIG. 1 shows major components of an image forming device relating to a first embodiment of the present invention.

As shown in FIG. 1, an image forming device 1 is a so-called tandem type of color printer, and includes image forming stations 110Y, 110M, 110C, and 110K that respectively form yellow (Y), magenta (M), cyan (C), and black (K) toner images. The image forming stations 110Y, 110M, 110C, and 110K respectively include photosensitive drums 101Y, 101M, 101C, and 101K that rotate in a direction indicated by an arrow A. Around outer circumferential surfaces of the photosensitive drums 101Y, 101M, 101C, and 101K, the following devices are arranged by color: charging devices 102Y, 102M, 102C, and 102K, optical PHs 100Y, 100M, 100C, and 100K, developing devices 103Y, 103M, 103C, and 103K, primary transfer rollers 104Y, 104M, 104C, and 104K, and cleaning devices 105Y, 105M, 105C, and 105K, in the stated order.

The charging devices 102Y, 102M, 102C, and 102K respectively perform uniform charging on the outer circumferential surfaces of the photosensitive drums 101Y, 101M, 101C, and 101K. In this charging processing, the charging devices 102Y, 102M, 102C, and 102K perform electric discharge by applying a charging bias voltage having a high voltage and a high frequency. This generates a high frequency noise (referred to hereinafter as AC noise).

The optical PHs 100Y, 100M, 100C, and 100K are so-called OLED-PHs, and respectively expose the outer circumferential surfaces of the photosensitive drums 101Y, 101M, 101C, and 101K to form electrostatic latent images.

The developing devices 103Y, 103M, 103C, and 103K respectively supply Y, M, C, and K toners to develop the electrostatic latent images to form Y, M, C, and K toner images. In this developing processing, the developing devices 103Y, 103M, 103C, and 103K respectively use a developing bias voltage having a high voltage and a high frequency to electrostatically absorb the toners onto the outer circumferential surfaces of the photosensitive drums 101Y, 101M, 101C, and 101K. This generates AC noise.

The primary transfer rollers 104Y, 104M, 104C, and 104K respectively electrostatically transfer the toner images carried on the photosensitive drums 101Y, 101M, 101C, and 101K onto an intermediate transfer belt 106 (primary transfer). After the primary transfer, the cleaning devices 105Y, 105M, 105C, and 105K respectively remove electric charge and toner that remain on the outer circumferential surfaces of the photosensitive drums 101Y, 101M, 101C, and 101K.

The intermediate transfer belt 106 is an endless belt tensioned by a secondary transfer roller pair 107 and driven rollers 108 and 109, and runs in a direction indicated by an arrow B. The Y, M, C, and K toner images are primarily transferred in accordance with running of the intermediate transfer belt 106 so as to be overlapped one another. As a result, a color toner image is formed. The intermediate transfer belt 106 runs while carrying the color toner image, thereby to convey the color toner image to a secondary transfer nip of the secondary transfer roller pair 107.

The secondary nip is generated by pressure-contact between two rollers constituting the secondary transfer roller pair 107. A secondary transfer voltage is applied between the two rollers. A recording sheet S is fed from a sheet feeding tray 120 in accordance with a conveyance timing of the color toner image by the intermediate transfer belt 106. The color toner image is electrostatically transferred onto the recording sheet S at the secondary transfer nip (secondary transfer).

The recording sheet S on which the color toner image is carried is conveyed to a fusing device 130, and is discharged onto a sheet discharge tray 140 after thermal fusing of the color toner image.

The image forming device 1 further includes a body-side controller 150. Upon receiving a print job from an external device such as a personal computer (PC), the body-side controller 150 controls operations of the image forming device 1 for image formation.

(1-2) Configuration of Optical PHs 100

The following describes the configuration of the optical PHs 100.

Figure 2:
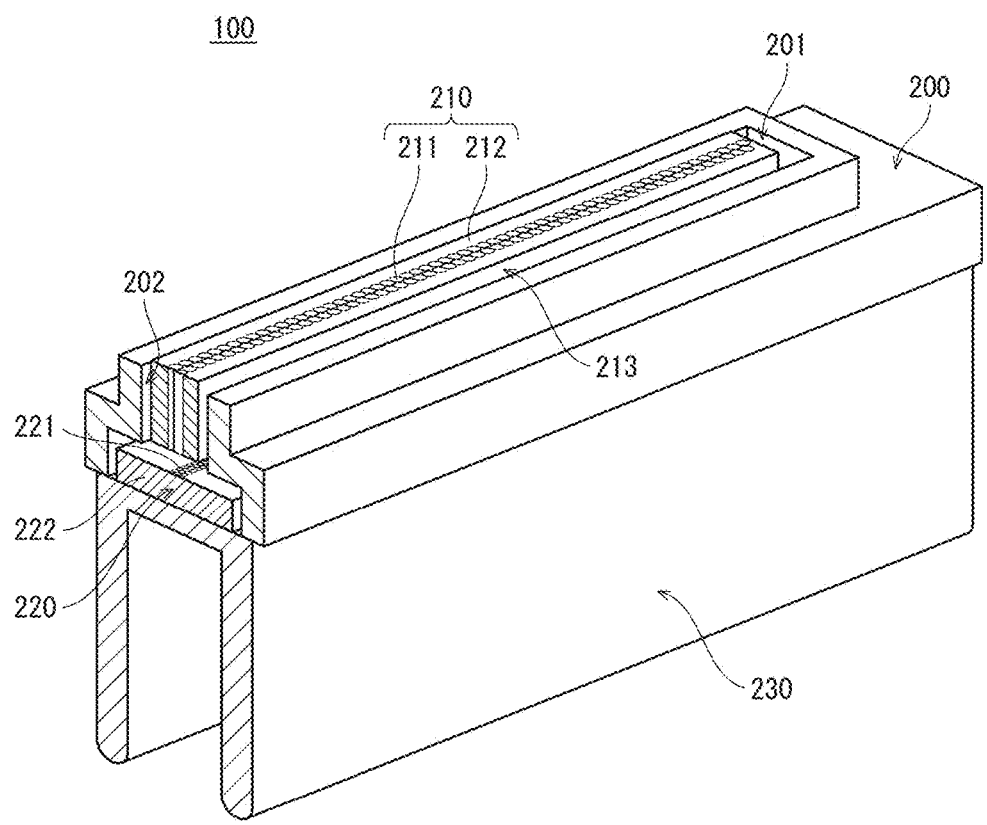
FIG. 2 is an external perspective view of major components of an optical PH 100.
Figure 2:
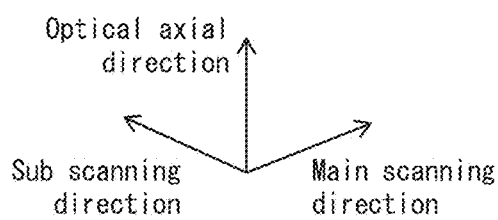

The optical PHs 100 each include, as shown in FIG. 2, an OLED panel 220, a lens holder 200, a lens array 210, and a reference holder 230.

The OLED panel 220 has a glass substrate 222. On a main surface of the glass substrate 222, which faces the lens array 210, a TFT circuit (not illustrated) is formed. The TFT circuit has mounted thereon OLEDs 221 (15,000 pieces in the present embodiment) that are arranged in staggered arrangements.

The lens array 210 is an elongated optical member, and has a longitudinal direction that coincides with a main scanning direction. The lens array 210 has rod lenses 211 adhered thereto by a resin 212. The rod lenses 211 are arranged in two or more staggered arrangements in the longitudinal direction. The lens array 210 condenses light emitted from the OLEDs 221 onto the outer circumferential surfaces of the photosensitive drums 110. The lens array 210 may be a Selfoc lens array (SLA, where Selfoc is a registered trademark of Nippon Sheet Glass Co., Ltd).

The lens holder 200 is a resin member that is elongated in the main scanning direction and has a slit 201 penetrating in an optical axial direction. The slit 201 is also elongated in the main scanning direction. With the lens array 210 inserted in the slit 201, the lens holder 200 holds the lens array 210 by bonding side wall surfaces 213 of the lens array 210 and inner wall surfaces 202 of the slit 201 in a sub scanning direction.

The reference holder 230 is a sheet-metal member made of steel such as stainless use steel (SUS). The reference holder 230 has a support surface to which the lens holder 200 and the OLED panel 220 are fixed. This configuration defines a positional relation among the OLEDs 221, the rod lenses 211, and the photosensitive drum 110.

Note that FIG. 2 omits illustration of cables and so on for connecting the optical PH 100 with each other devices such as the body-side controller 150 included in the image forming device 1.

(1-3) OLED Panel 220

The following describes the configuration of the OLED panel 220.

Figure 3:
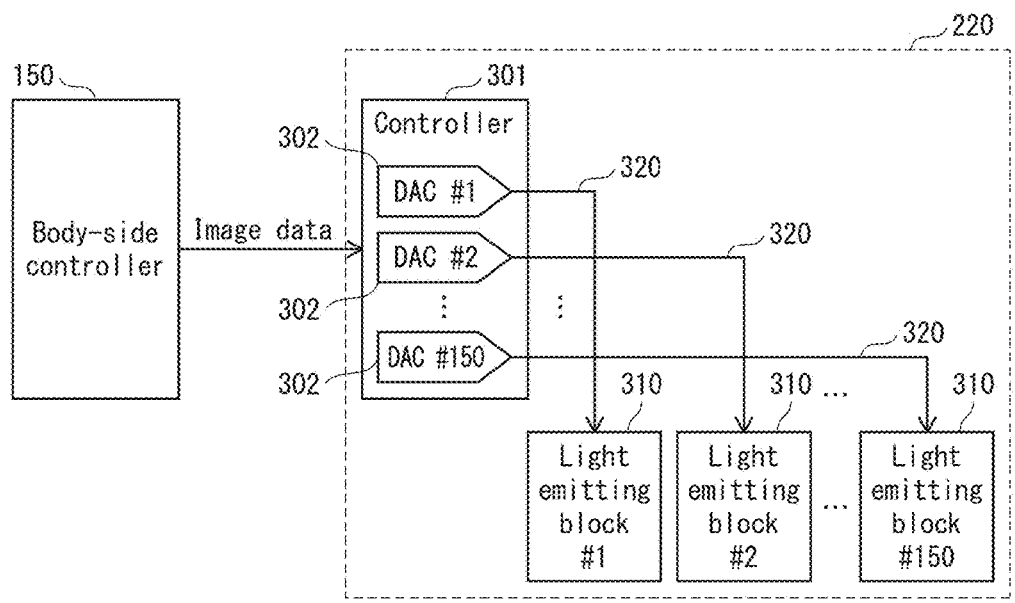
FIG. 3 is a block diagram showing major components of an OLED panel 220.

As shown in FIG. 3, the OLED panel 220 relating to the present embodiment includes a controller 301 and further includes 150 light emitting blocks 310. The controller 301 is a so-called integrated circuit (IC), and includes therein 150 digital-to-analog converters (DACs) 302, which are equal in number to and correspond one-to-one to the light emitting blocks 310. The light emitting blocks 310 each have 100 OLEDs 221 allocated thereto.

Upon receiving image data pieces from the body-side controller 150, the controller 301 distributes image data to each of the DACs 302 by the number of OLEDs 221 included therein for each main scanning period, which is a time period for exposing a single main scanning line. The DACs 302 each DA convert the distributed image data to generate a control voltage Vdac, and input the generated control voltage Vdac to a corresponding one of the light emitting blocks 310 via a control wiring 320.

Figure 4:
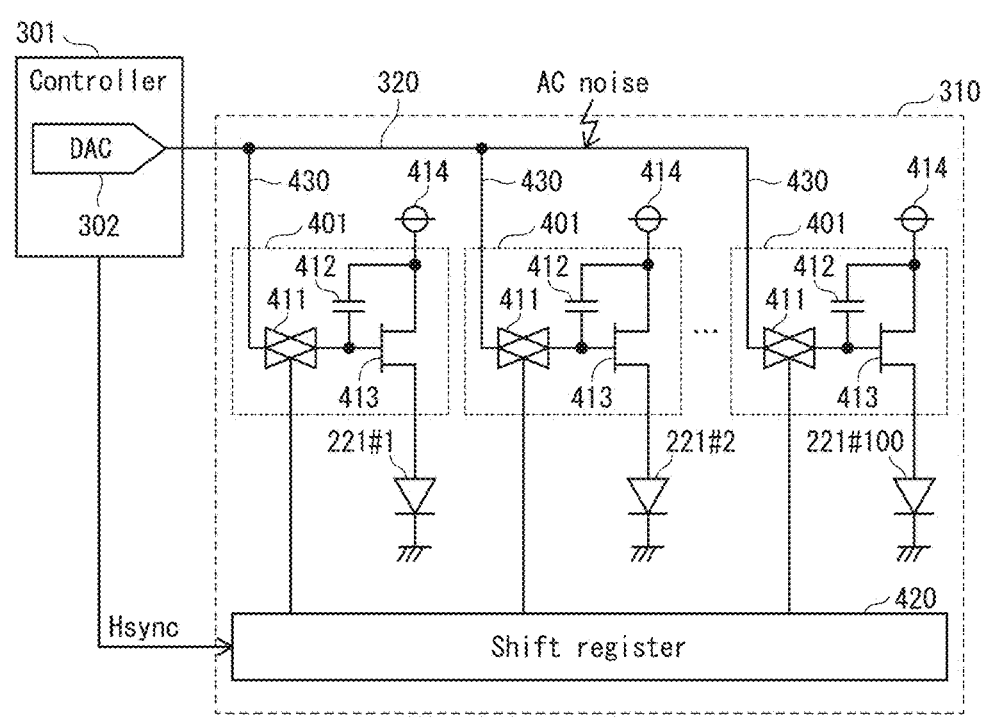
FIG. 4 is a circuit diagram showing major components of light emitting blocks 310.

As shown in FIG. 4, the light emitting block 310 includes 100 OLEDs 221, drivers 401 provided for each of the OLEDs 221, and a shift register 420. The control voltage Vdac output from the DAC 302 reaches the light emitting block 310 via the control wiring 320, and then is input to one of the drivers 401 selected by the shift register 420 via a drawing wiring 430 drawn from the control wiring 320. The driver 401 supplies a drive current Id according to the control voltage Vdac to the OLED 221.

The drivers 401 each include an analog switch 411, a capacitor 412, and a driving transistor 413.

The analog switch 411 switches on and off electric connection between the drawing wiring 430 and one of terminals of the capacitor 412, according to a sample/hold signal SH output from the shift register 420 in synchronization with a horizontal synchronization signal Hsync. The other terminal of the capacitor 412 is connected to a reference source 414. Accordingly, while the analog switch 411 switches on the electric connection, a voltage difference between a reference voltage Vdd supplied by the reference source 414 and a control voltage Vdac is applied to the capacitor 412. While the analog switch 411 switches off the electric connection, the capacitor 412 holds the voltage difference.

The one terminal and the other terminal of the capacitor 412 are respectively connected to a gate terminal and a source terminal of the driving transistor 413. Accordingly, when the voltage held in the capacitor 412 is applied as a gate-source voltage Vgs to the driving transistor 413, a drain current is supplied according to the held voltage as a drive current Id to the OLED 221.

Note that since the shift register 420 outputs a sample/hold signal SH in synchronization with a horizontal synchronization signal Hsync as described above, the OLEDs 221 accordingly emit light in synchronization with the horizontal synchronization signal Hsync.

Also, although the driving transistor 413 is a P-channel transistor in the above example, the present invention is of course not limited to this, and an N-channel transistor may be used instead of the P-channel transistor.

(1-4) Arrangement of OLEDs 221

The following describes the arrangement of the OLEDs 221.

Figure 5:
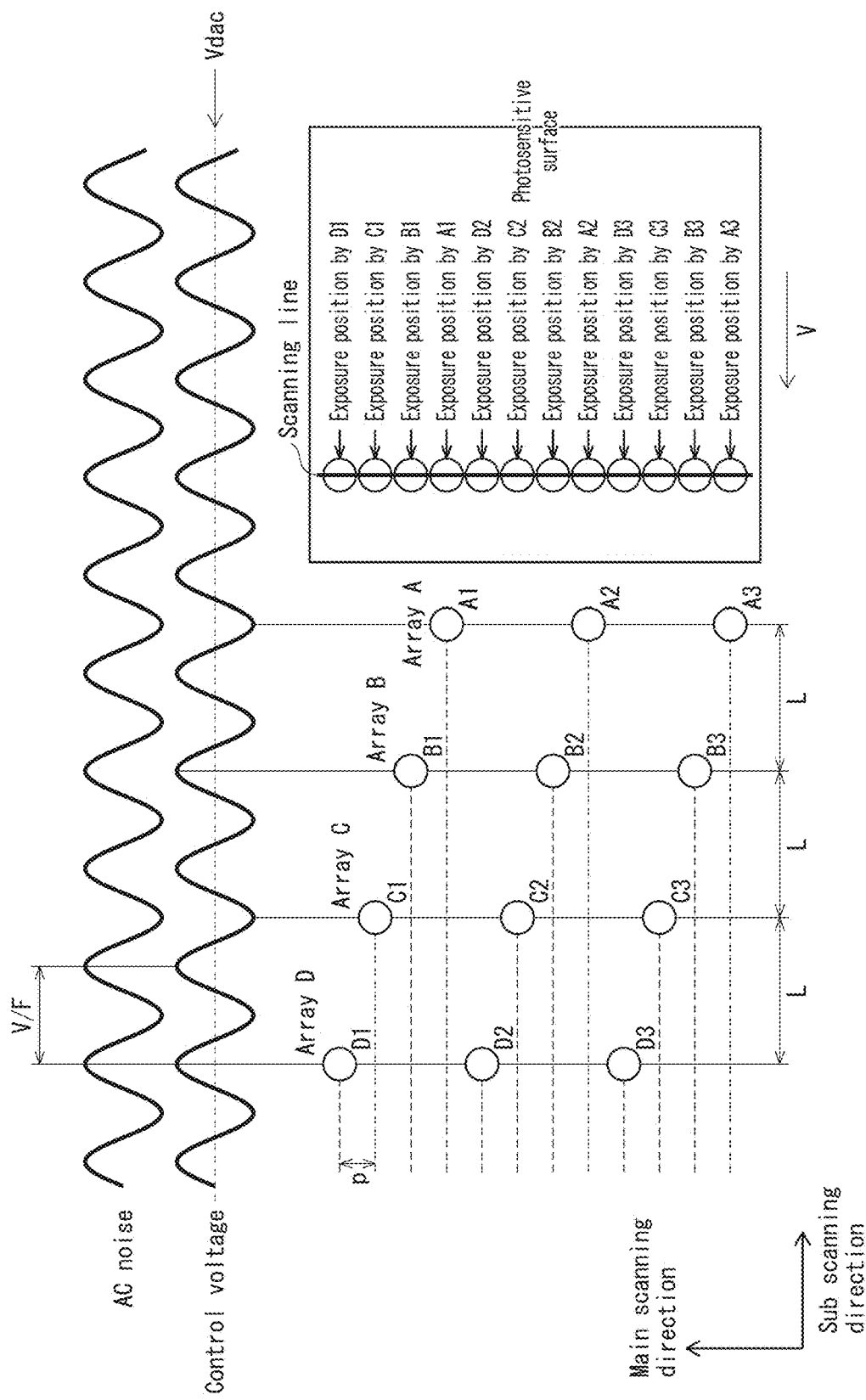
FIG. 5 explains a relation among array intervals L between OLED arrays, a system speed V, and an AC noise frequency F.

The OLEDs 221, which are included in the OLED panel 220, each belong to any one of four OLED arrays, namely arrays A, B, C, and D. As shown in FIG. 5, the OLEDs 221 are arranged in staggered arrangements such that the arrays A to D are arranged in the stated order in the sub scanning direction. In the present embodiment, the OLEDs 221 are arranged at intervals p of 21.2 μm (1200 dpi) in the main scanning direction.

The OLED arrays are arranged at intervals L in the sub scanning direction (referred to hereinafter as array intervals L). The array intervals L have a length equal to a product of the system speed V of the image forming device 1 and 10 scanning periods, as shown in Math (4) below.

$$L = 10 \times H \times V \tag{4}$$

where H expresses the length of one scanning period (time period) and the system speed V expresses a circumferential speed of the photosensitive drums 101. In other words, a horizontal scanning line (referred to hereinafter simply as a scanning line), which has been exposed by OLEDs 221 included in any one of the OLED arrays, reaches exposure positions by OLEDs 221 included in a subsequent OLED array after 10 scanning periods.

Figure 6:
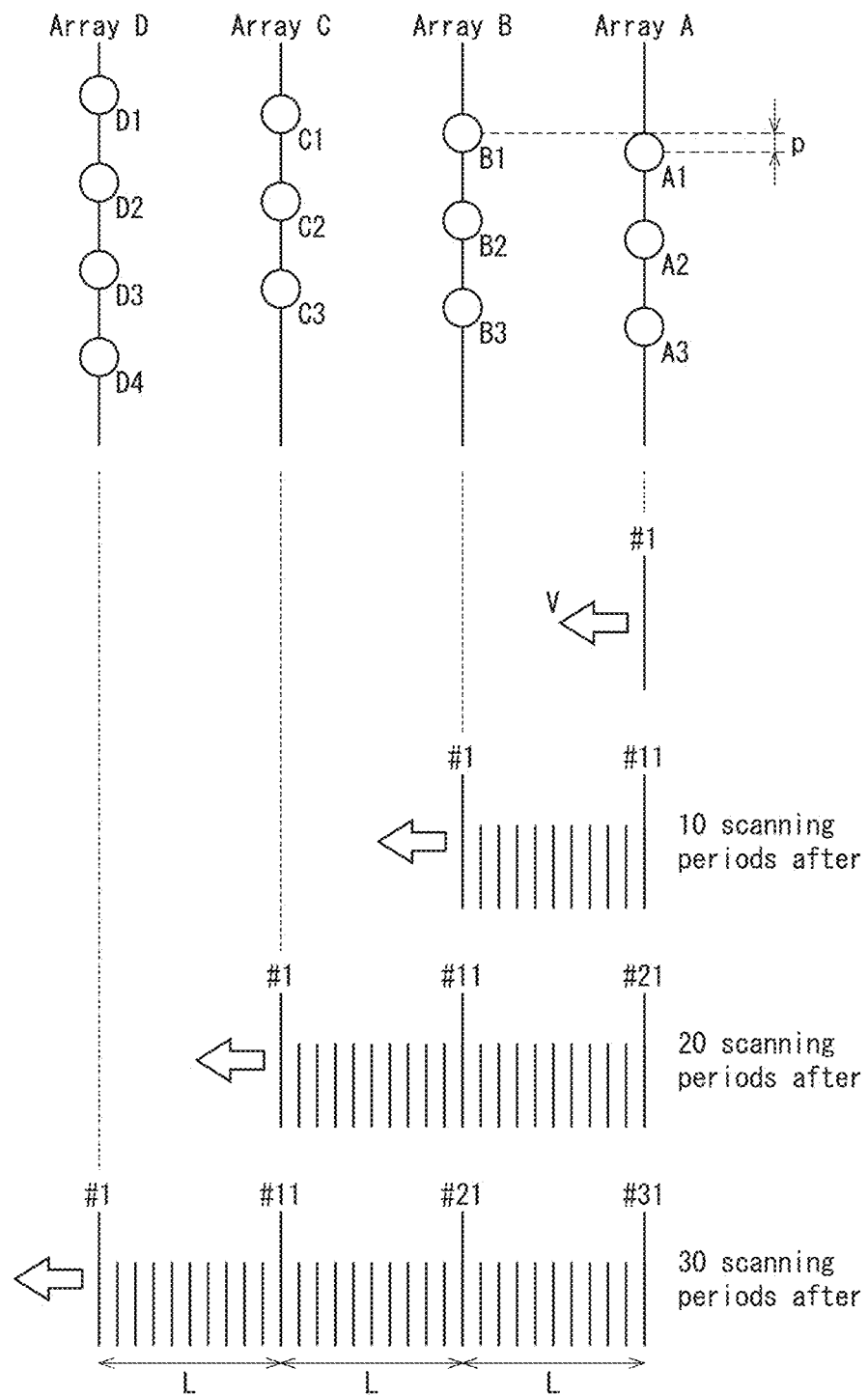
FIG. 6 explains an exposure time for each scanning line.

As exemplified in FIG. 6, OLEDs 221 included in the array A firstly perform exposure on exposure positions by the array A corresponding to exposure points on a 1st scanning line. After 10 scanning periods, OLEDs 221 included in the array B perform exposure on exposure positions by the array B corresponding to exposure points on the same 1st scanning line. Similarly, OLEDs 221 included in the array C perform exposure on exposure positions by the array C corresponding to exposure points on the same 1st scanning line after 20 scanning periods, and OLEDs 221 included in the array D perform exposure on exposure positions by the array D corresponding to exposure points on the same 1st scanning line after 30 scanning periods. The OLEDs 221 included in the arrays A to D perform exposure on each of 2nd and subsequent scanning lines in the same manner.

Note that, after the above 10 scanning periods, the OLEDs 221 included in the array A expose an 11th scanning line. Also, after the above 20 scanning periods, the OLEDs 221 included in the array A expose a 21st scanning line, and the OLEDs 221 included in the array B expose the 11th scanning line. Furthermore, after the above 30 scanning periods, the OLEDs 221 included in the array A expose a 31st scanning line, the OLEDs 221 included in the array B expose the 21st scanning line, and the OLEDs 221 included in the array C expose the 11th scanning line.

Also, as shown in FIG. 5, the array intervals L and the system speed V are determined such that AC noise at an exposure time of a scanning line by the OLEDs 221 included in the array A is opposite in phase to AC noise at an exposure time of the same scanning line by the OLEDs 221 included in the array B as shown in Math (5) below.

$$L = (3/2) \times (V/F) \tag{5}$$

where F expresses frequency of AC noise.

With this configuration, AC noise at an exposure time of a scanning line by OLEDs 211 included in one array is opposite in phase to AC noise at an exposure time of the same scanning line by OLEDs 211 included in an array adjacent to the one array. This applies to each of the following combinations: combination of the arrays A and B, combination of the array B and C, combination of the arrays C and D, and combination of the arrays D and A. In other words, each two adjacent exposure points on a single scanning line are opposite in phase of AC noise to each other.

Also, phase of AC noise coincides with phase of a noise component superimposed on the control voltage Vdac (noise voltage). As the noise voltage increases, the drive current increases and thus the light emission amount of the OLEDs 221 increases. As the noise voltage decreases, the drive current decreases and thus the light emission amount of the OLEDs 221 decreases. Accordingly, since each two adjacent exposure points on the same scanning line are opposite in phase of AC noise to each other, the light emission amount of the OLEDs 221 increases on one of the two adjacent exposure points, and decreases on the other exposure point, and vice versa.

Figure 7A:
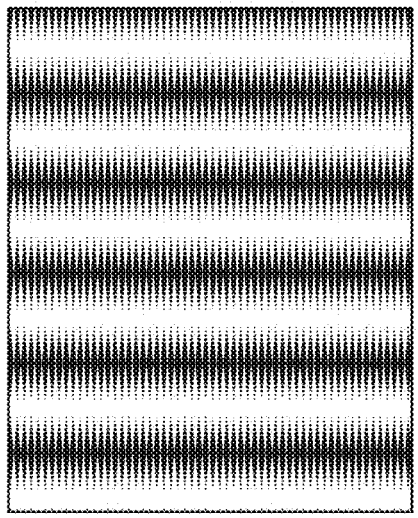
FIG. 7A exemplifies streak noise, and FIG. 7B explains the streak noise after averaging.
Figure 7B:
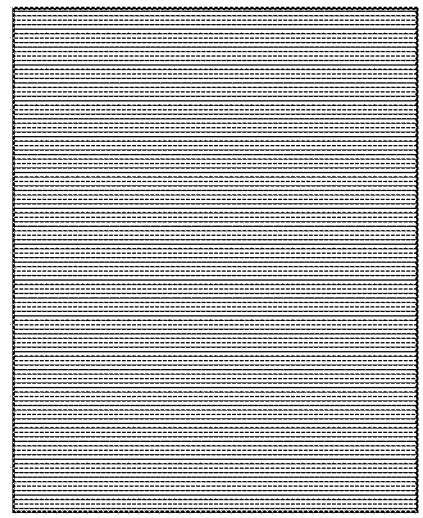

This results in an averaged value of noise voltage on exposure points in units of scanning lines being zero. Meanwhile, as each two adjacent OLED arrays are less opposite in phase of AC noise to each other, the averaged value of noise voltage is farther from zero. When each two adjacent OLED arrays are in-phase of AC noise with each other, the averaged value of noise voltage reaches the maximum and thus streak noise becomes the most noticeable (FIG. 7A). In this sense, streak noise is eliminated according to the present embodiment (FIG. 7B).

(1-5) Configuration of Body-Side Controller 150

The system speed of the image forming device 1 is not necessarily constant. For example, since a time period necessary for toner image fusing differs depending on whether a recording sheet S for image formation is plain paper or heavy paper, the body-side controller 150 performs control such that the system speed is lower for heavy paper than for plain paper.

Figure 8:
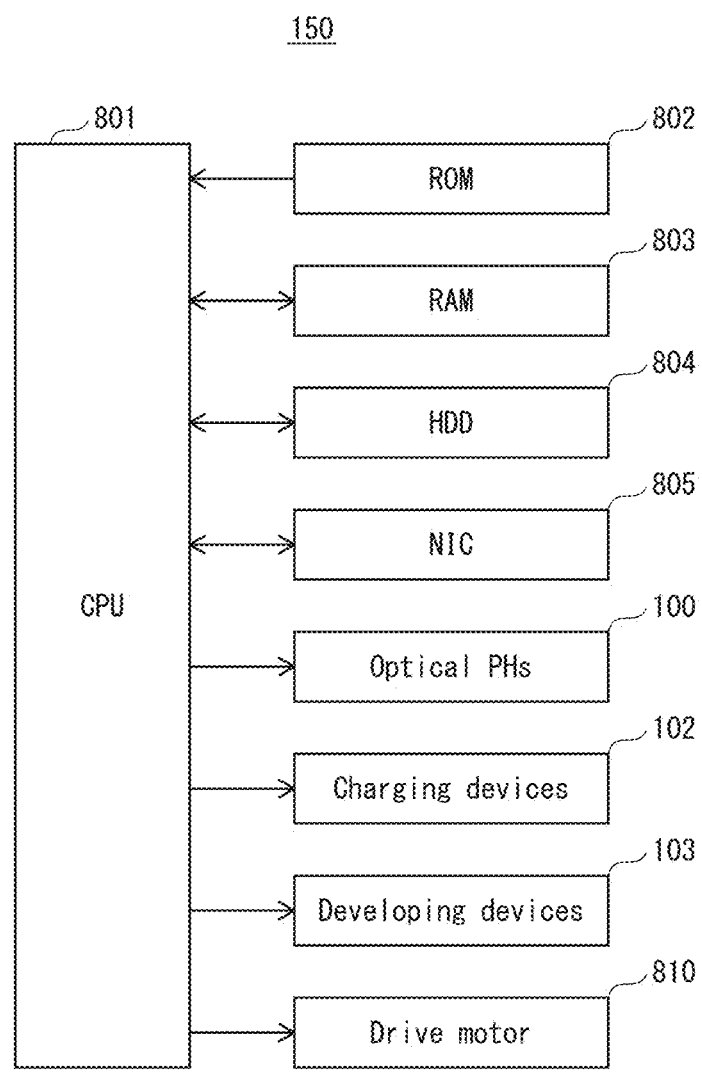
FIG. 8 is a block diagram showing major components of a body-side controller 150.

The body-side controller 150 includes, as shown in FIG. 8, a central processing unit (CPU) 801, a read only memory (ROM) 802, a random access memory (RAM) 803, and so on. Upon power-on of the image forming device 1, the CPU 801 reads a boot program from the ROM 802 to start up. Then, the CPU 801 executes an operating system (OS), a control program, and so on read from a hard disk drive (HDD) 804, with use of the RAM 803 as a storage region for work.

Also, the CPU 801 accesses a communication network such as a local area network (LAN) with use of a network interface card (NIC) 805 to receive a print job from an external device such as a PC. In execution of the print job, the CPU 801 controls the optical PHs 100, the charging devices 102, the developing devices 103, and so on thereby to control frequency of the charging voltage of the charging devices 102 and frequency of the developing voltage of the developing devices 103.

Furthermore, the CPU 801 controls a drive motor 801, which drives conveyance of recording sheets S, rotation of the intermediate transfer belt 106, and rotation of the photosensitive drums 101Y, 101M, 101C, and 101K, thereby to control the system speed V.

(1-6) Settings of Array Intervals L

In the above section (1-4), the description has been given on the case where the array intervals L satisfy the above Math (5). In general, as long as the array intervals L satisfy Math (6) below, each two adjacent OLED arrays can be opposite in phase of noise voltage to each other.

$$L=(D/2)\times(V/F) \qquad (6)$$

where D is an odd number, and D/2 expresses a wave number of AC noise in a time period from the end of exposure of a scanning line by one OLED array to the start of exposure of the same scanning line by a subsequent OLED array. Accordingly, the odd number D is double the wave number of AC noise. Hereinafter, the odd number D is referred to as a double wave number D.

Thus, the body-side controller 150 adjusts the AC noise frequency F such that the above Math (6) is satisfied regardless of variation in the system speed V, thereby to eliminate streak noise. FIG. 9 is a table showing the array intervals L for each combination of the system speed V, the AC noise frequency F, and the double wave number D. As shown in FIG. 9, with respect to possible values of the system speed V of 100 mm/sec, 200 mm/sec, 300 mm/sec, and 400 mm/sec, the double wave numbers D of 39, 19, 13, and 9 are respectively obtained by setting the array intervals L to 0.78 mm. Thus, since the double wave number D is always an odd number when the system speed V has either of the above values, each two adjacent OLED arrays are opposite in phase of AC noise to each other. Therefore, it is possible to eliminate streak noise.

Note that the AC noise frequency F may be controlled for example by storing in advance frequency of the charging bias voltage of the charging devices 102 and/or frequency of the developing bias voltage of the developing devices 103 for each of values of the system speed V of the image forming device 1, and using any of the stored charging bias voltage and/or developing bias voltage which corresponds to any value of the system speed V according to a target print job.

[2] Second Embodiment

The following describes a second embodiment of the present invention.

When the array intervals L, the system speed V, and the AC noise frequency F are set in the above Math (6) such that the double wave number D is an odd number, the array intervals L are sometimes not an integral multiple of line intervals Ls between scanning lines. An image forming device 1 relating to the present embodiment is based on an assumption of such a case. The image forming device 1 relating to the present embodiment has substantially the same configuration as the image forming device 1 relating to the above first embodiment, and differs from that of the above first embodiment in terms of relation between the array intervals L and the line intervals Ls and in terms of control operations of the light emission time of the OLEDs 221. The following description mainly focuses on the differences. Note that members and the like that are common to the embodiments have the common numeric references throughout the present description.

The number of OLED arrays is four in optical PHs 100 relating to the present embodiment as well as in the optical PHs 100 relating to the above first embodiment. Meanwhile, while the array intervals L are 10 times the line intervals Ls in the above first embodiment, the array intervals L are 2.2 times the line intervals Ls, which is not an integral multiple, in the present embodiment as shown in Math (7) below.

$$L=2.2\times H\times V \qquad (7)$$

Due to this, the present embodiment uses horizontal synchronization signals Hsync_A, Hsync_B, Hsync_C, and Hsync_D that differ in timing among the OLED arrays.

Figure 10:
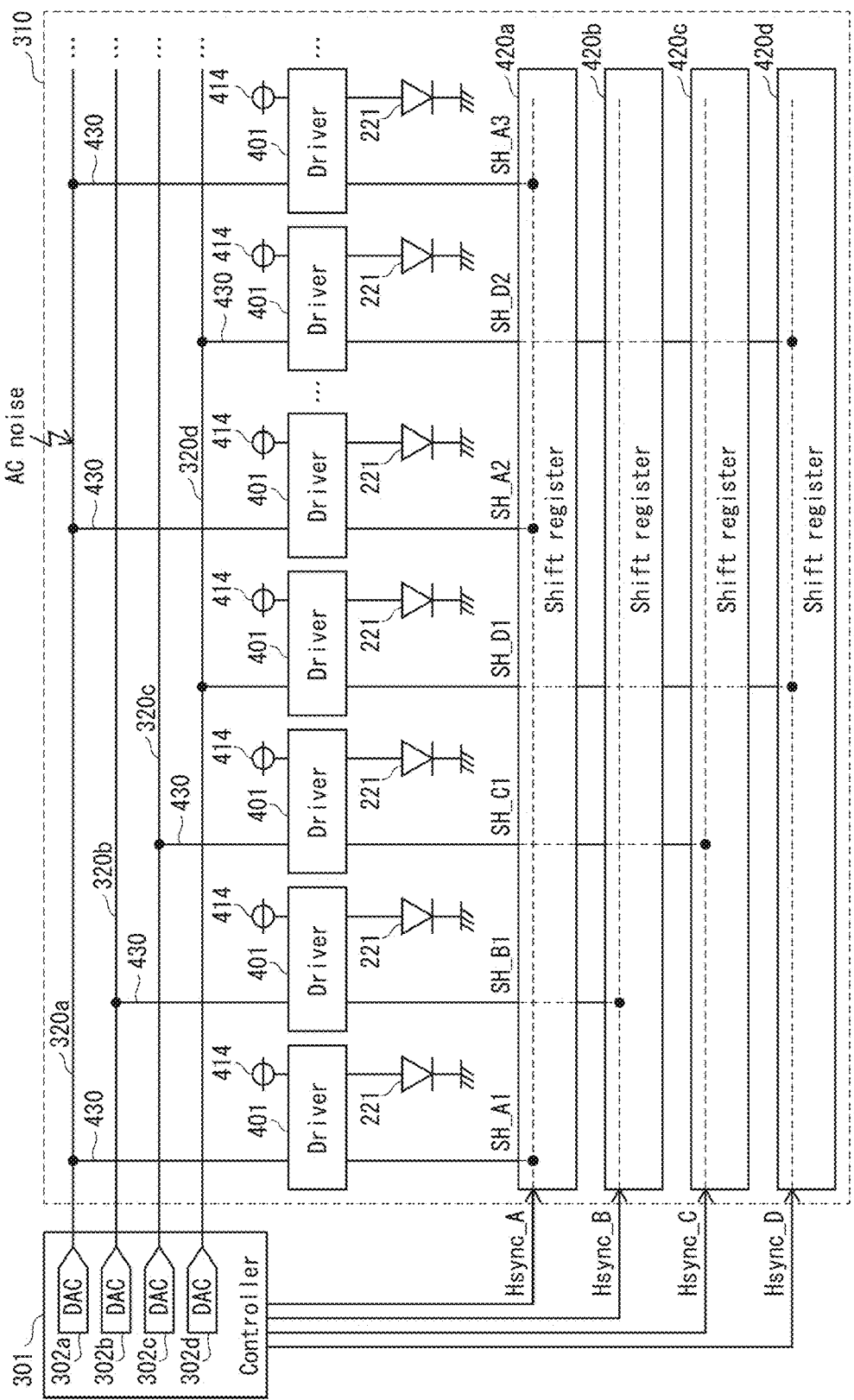
FIG. 10 is a circuit diagram showing major components of light emitting blocks 310 relating to a second embodiment of the present invention.

As shown in FIG. 10, a controller 301 supplies each of shift registers 420 with any of the horizontal synchronization signals Hsync_A, Hsync_B, Hsync_C, and Hsync_D. The shift register 420 outputs sample/hold signals SH_A1, SH_A2, SH_A3, . . . to drivers 401 for driving OLEDs 221 included in an array A, in synchronization with the horizontal synchronization signal Hsync_A, which is for the array A.

Similarly, sample/hold signals SH_B1 . . . are output to drivers 401 for driving OLEDs 221 included in an array B in synchronization with the horizontal synchronization signal Hsync_B, which is for the array B. Sample/hold signals SH_C1 . . . are output to drivers 401 for driving OLEDs 221 included in an array C in synchronization with the horizontal synchronization signal Hsync_C, which is for the array C. Sample/hold signals SH_D1 . . . are output to drivers 401 for driving OLEDs 221 included in an array D in synchronization with the horizontal synchronization signal Hsync_D, which is for the array D.

Figure 11:
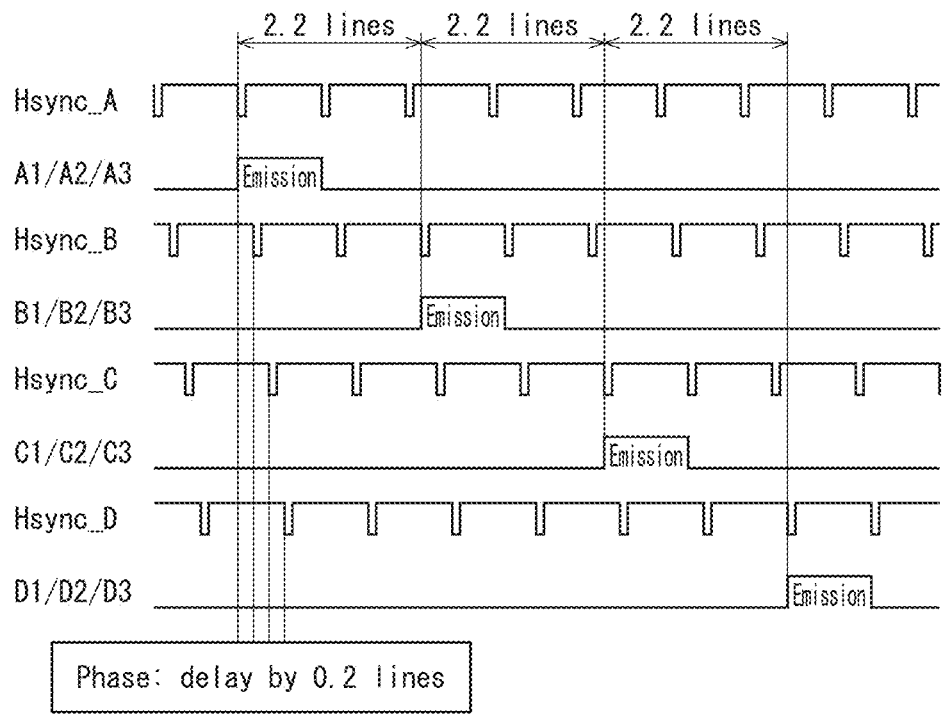
FIG. 11 is a timing chart exemplifying a horizontal synchronizing signal output by a controller 301 and a light emission time of each OLED array relating to the second embodiment, specifically showing the case where the array intervals L are not an integral multiple of line intervals Ls between scanning lines.

As shown in FIG. 11, the horizontal synchronization signals Hsync_A, Hsync_B, Hsync_C, and Hsync_D each have a cycle coincident with the main scanning period. Meanwhile, each two adjacent horizontal synchronization signals are shifted in phase from each other by 0.2 lines (20% of the main scanning period). Specifically, the horizontal synchronization signal Hsync_B is delayed relative to the horizontal synchronization signal Hsync_A by 0.2 lines, and the horizontal synchronization signal Hsync_C is delayed relative to the horizontal synchronization signal Hsync_B by 0.2 lines. Similarly, the horizontal synchronization signal Hsync_D is delayed relative to the horizontal synchronization signal Hsync_C by 0.2 lines.

The OLEDs 221 included in the array A exposure one scanning line in synchronization with the horizontal synchronization signal Hsync_A. Then, the scanning line advances by 2.2 lines to reach exposure positions by the OLEDs 221 included in the array B. Since the horizontal synchronization signal Hsync_B is delayed relative to the horizontal synchronization signal Hsync_A by 2.2 lines, the OLEDs 221 included in the array B exactly expose the scanning line in synchronization with the horizontal synchronization signal Hsync_B. Similarly, since the horizontal synchronization signal Hsync_C is delayed relative to the horizontal synchronization signal Hsync_B by 0.2 lines and the horizontal synchronization signal Hsync_D is delayed relative to the horizontal synchronization signal Hsync_C by 0.2 lines, the respective OLEDs 221 included in the arrays C and D also exactly exposure the scanning line.

With this above configuration, each two adjacent exposure points on each scanning line are opposite in phase of AC noise to each other. Therefore, in the sense of the averaged value of noise voltage in units of scanning lines being zero, it is possible to eliminate streak noise.

In the case where the array intervals L are not an integral multiple of the line intervals Ls, it is possible to eliminate streak noise by delaying the scanning start timing as follows: with respect to each two adjacent upstream and downstream OLED arrays in the sub scanning direction among the OLED arrays, start of scanning by the downstream OLED array is delayed relative to start of scanning by the upstream OLED array, by a time period shown in Math (8) below.

$$(((([L/Ls]+1) \times Ls) - L)/L) \times H \quad (8)$$

where H expresses the length of the main scanning period.

Figure 12:
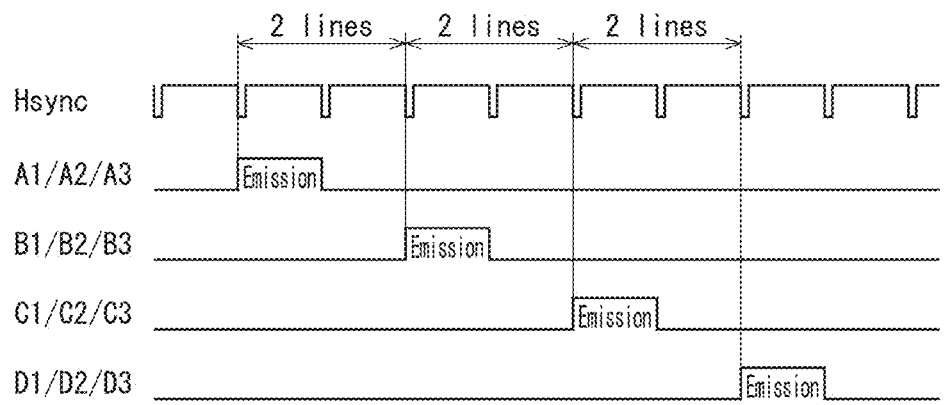
FIG. 12 is a timing chart exemplifying a horizontal synchronizing signal output by the controller 301 and the light emission time of each OLED array relating to the second embodiment, specifically showing the case where the array intervals L are an integral multiple of the line intervals Ls.

Note that phase delay such as described above is unnecessary in the case where the array intervals L are an integral multiple of the line intervals Ls. In the case for example where the array intervals L are double the line intervals Ls, it is possible to expose the same scanning lines by the OLEDs 221 included in all the OLED arrays without any phase delay, as shown in FIG. 12. Further, it is possible to eliminate streak noise by setting the array intervals L, the double wave number D, the system speed V, and the AC noise frequency F that satisfy the above Math (6).

[3] Third Embodiment

The following describes a third embodiment of the present invention. An image forming device 1 relating to the present embodiment has substantially the same configuration as the image forming device 1 relating to the above first embodiment. Meanwhile, a difference exists therebetween in terms of exposure on the outer circumferential surfaces of the photosensitive drums 101. While single exposure is performed in the above first embodiment, multiple exposure is performed in the present embodiment. The following description mainly focuses on the difference.

Figure 13:
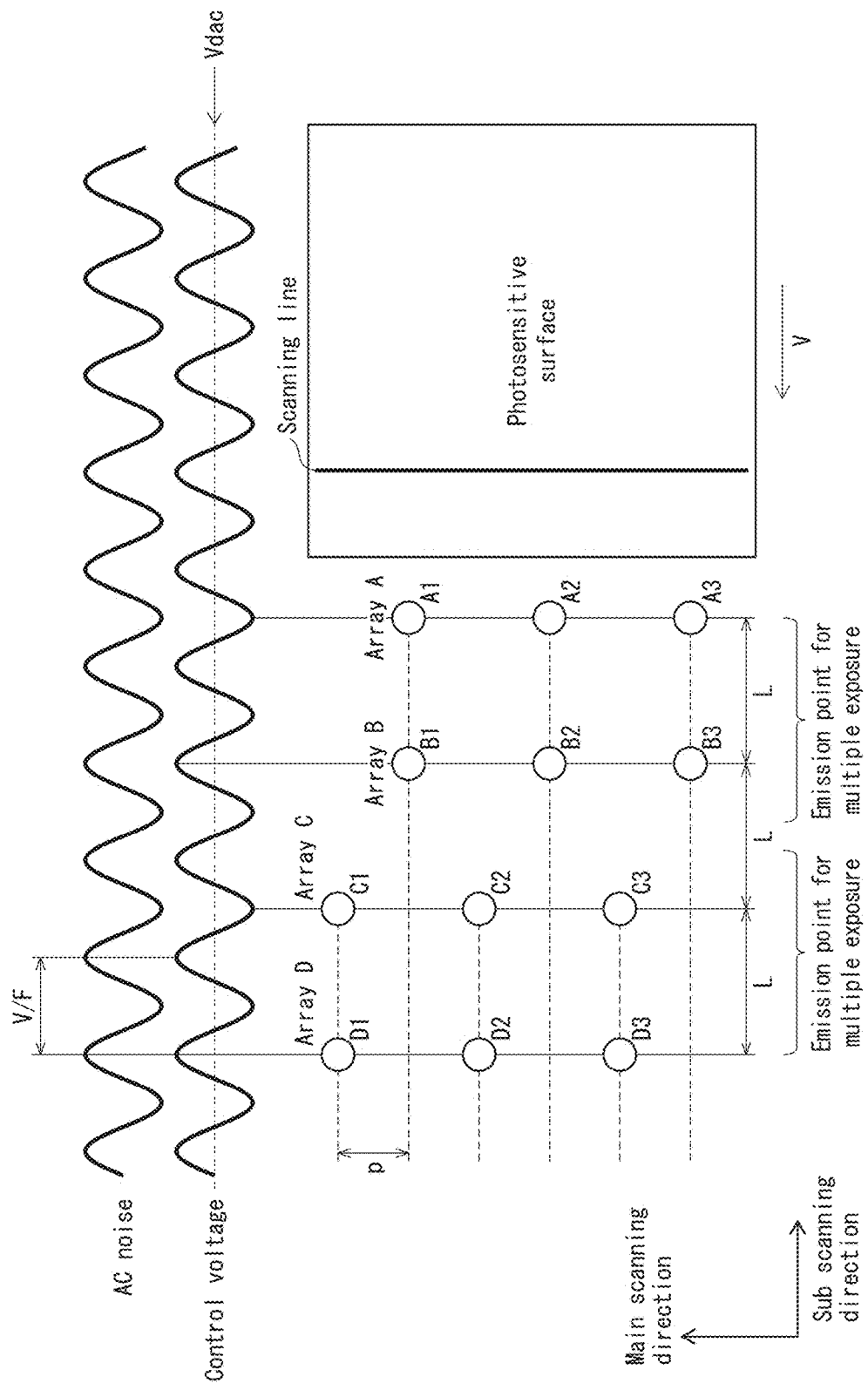
FIG. 13 explains a relation among the array intervals L between OLED arrays, the system speed V, and the AC noise frequency F relating to a third embodiment of the present invention.
Figure 14A:
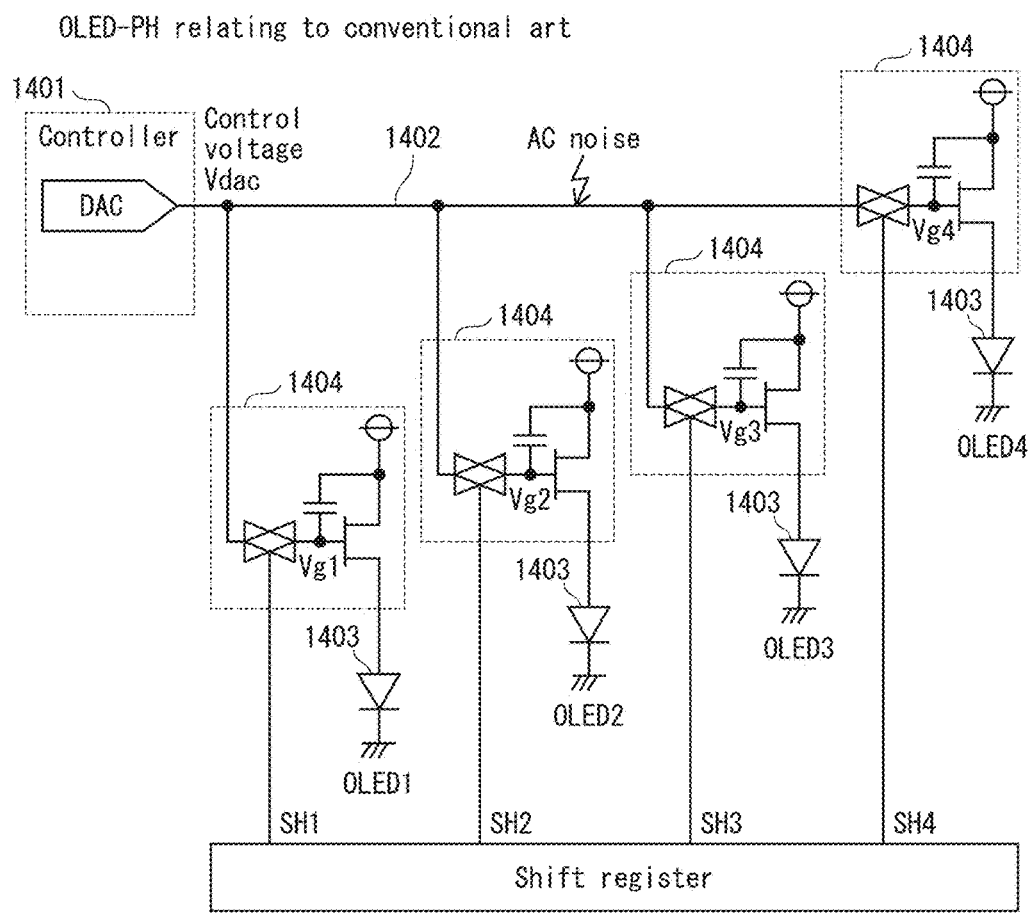
FIG. 14A is a circuit diagram showing major components of OLED-PHs relating to a conventional art, and FIG. 14B explains streak noise resulting from AC noise superimposed on a control voltage Vdac relating to the conventional art.
Figure 14B:
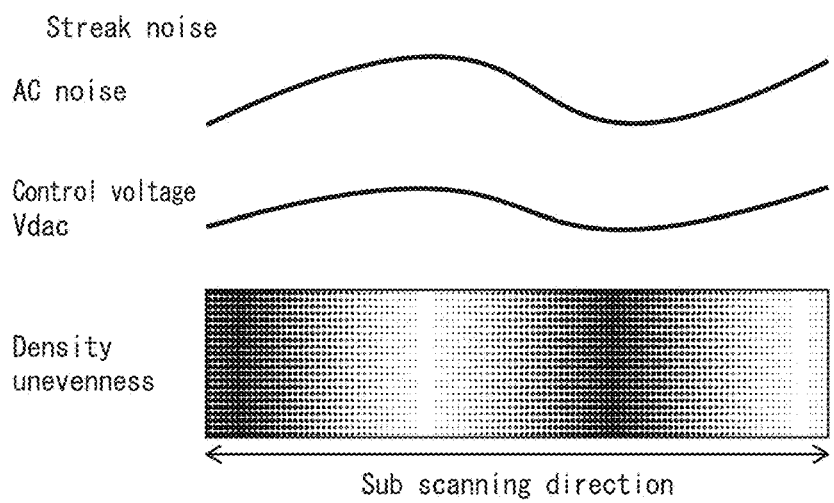

In an OLED panel 220 relating to the present embodiment as shown in FIG. 13, multiple exposure is performed by four OLED arrays in pairs, each of which include OLEDs 221 arranged in the main scanning direction, namely by a pair of arrays A and B and a pair of arrays C and D. The OLEDs 221 included in the array A and the OLEDs 221 included in the array C, which alternate in the main scanning direction, are arranged at intervals p of for example 21.2 μm (1200 dpi).

In the present embodiment, the array intervals L are two lines. Note that, in the case where the array intervals L are an integral multiple of the line intervals Ls, it is possible to perform multiple exposure by using the horizontal synchronization signal Hsync, which is common to all the OLED arrays, like in the above first embodiment. Also, in the case where the array intervals L are not an integral multiple of the line intervals Ls, it is possible to perform multiple exposure by shifting the phase of the horizontal synchronization signal Hsync, which is common to all the OLED arrays, like in the above second embodiment.

With this configuration, at an exposure point on which multiple exposure is performed by the combination of the arrays A and B, the OLEDs 221 included in the array A and the OLEDs 221 included in the array B are opposite in phase of AC noise to each other. Thus, it is possible to cancel variation in light amount resulting from AC noise. Similarly, at an exposure point on which multiple exposure is performed by the combination of the arrays C and D, the OLEDs 221 included in the array C and the OLEDs 221 included in the array D are opposite in phase of AC noise to each other. Thus, it is also possible to cancel variation in light amount resulting from AC noise.

This allows elimination of streak noise resulting from AC noise and formation of excellent images accordingly.

Note that the arrays B and C may be arranged in intervals other than the array intervals L.

Further, the OLEDs 221 in the present embodiment are arranged in staggered arrangements, too.

[4] Modifications

Above, the present invention is described based on the embodiments, but the present invention is of course not limited to the embodiment above, and the following modifications of the present invention may be implemented.

(4-1) In the above first embodiment, the description has been given taking an example the case where the AC noise frequency F is variable. However, the present invention is of course not limited to this. Alternatively, the following modification is possible in the case where the AC noise frequency F is fixed.

It is possible to disable visual recognition of streak noise by keeping an actual value of the array intervals L within an acceptable range of ideal array intervals Lideal, which corresponds to ±10% of a single wavelength of AC noise, where the ideal array intervals Lideal express a value of the array intervals L which is calculated by the above Math (6) with the double wave number D being an odd number. In other words, in the case where the AC noise frequency F is fixed, it is desirable to set the system speed V that satisfies Math (9) below.

$$L\text{ideal} - ((V/F) \times 0.1) \leq L \leq L\text{ideal} + ((V/F) \times 0.1) \qquad (9)$$

Further, also in the case where the AC noise frequency F and the system speed V are both fixed, it is possible to disable visual recognition of streak noise by setting the actual value of the array intervals L that satisfy the above Math (9).

Moreover, the double wave number D may not be an integer in the above second embodiment, either as long as the array intervals L satisfy the above Math (9).

(4-2) In the above first embodiment, the description has been given taking an example the case where the number of the OLED arrays is four. However, the present invention is of course not limited to this. Alternatively, the number of the OLED arrays may be arbitrary, but should be desirably plural because of necessity for canceling AC noise effects.

Also, respective exposure points, on which exposure is performed by two OLED arrays positioned at the both ends of the OLED arrays arranged in the sub scanning direction like the arrays A and D in the above embodiment, are adjacent to each other on each scanning line. Accordingly, it is further desirable that such two OLED arrays positioned at the both ends of OLED arrays arranged in the sub scanning direction should be opposite in phase of AC noise to each other. In this case, the number of the OLED arrays should be preferably an even number.

(4-3) In the above first embodiment, the description has been given taking an example the case where the array intervals L are exact 10 times the line intervals Ls. However, the present invention is of course not limited to this.

Alternatively, the array intervals L may be any integral multiple of the line intervals Ls instead of 10 times the line intervals Ls.

(4-4) In the above embodiments, the description has been given taking an example the case where AC noise is composed of a single frequency component. However, the present invention is of course not limited to this. Alternatively, the following modification is possible in the case where AC noise is composed of a plurality of frequency components.

It is possible to suppress streak noise thereby to effectively form excellent images, by setting the array intervals L, the system speed V, and the double wave number D that satisfy the above Math (6) with the AC noise frequency F which for example expresses a frequency of a frequency component having the highest amplitude among frequency components of AC noise. The AC noise frequency F in this case may express a frequency of AC noise generated by one of the charging devices 102 and the developing devices 103 which have a higher amplitude of AC noise than the others.

(4-5) In the above embodiments, the description has been given taking an example the case where the array intervals L, the system speed V, and the AC noise frequency F are adjusted such that each two adjacent exposure points on each scanning line are opposite in phase of AC noise to each other. However, the present invention is of course not limited to this. Alternatively, the following modification is possible.

For example, the array intervals L, the system speed V, and the AC noise frequency F may be adjusted such that the arrays A and B are in-phase of AC noise with each other, the arrays B and C are opposite in phase of AC noise to each other, and the arrays C and D are in-phase of AC noise with each other. With this configuration, each two adjacent combinations on each scanning line, each of which is constituted from two adjacent exposure points on the scanning line, are opposite in phase of AC noise to each other. This prevents easy visual recognition of density unevenness resulting from AC noise to a certain degree. In this case, the combinations may be constituted from three or more adjacent exposure points on the scanning line.

(4-6) In the above third embodiment, the description has been given taking an example the case where the combination of the arrays A and B and the combination of the arrays C and D each perform multiple exposure and combinations of OLEDs, each of which is constituted from two OLEDs that are adjacent in the sub scanning direction and are included in respective two OLED arrays constituting a combination of OLED arrays, are arranged in staggered arrangements. However, the present invention is of course not limited to this. Alternatively, the following modification is possible. Even in the case where combinations of OLEDs, each of which is constituted from two OLEDs that are adjacent in the sub scanning direction and are included in respective two OLED arrays constituting a combination of OLED arrays, are not arranged in staggered arrangements, it is possible to cancel variation in light amount resulting from AC noise, by setting the array intervals L that satisfy the above Math (6) with respect to the OLED arrays constituting either one of the combinations of OLED arrays. This suppresses generation of streak noise.

The number of OLED arrays constituting each combination of OLED arrays is of course not limited to two. Even in the case where each combination of OLED arrays is constituted from three or more OLED arrays, it is possible to suppress image deterioration resulting from AC noise, by setting the array intervals L, the system speed V, and the AC noise frequency F thereby to cancel variation in light amount resulting from AC noise.

Note that the term "exposure" on the outer circumferential surfaces of the photosensitive drums 101 expresses a general concept including both "single exposure" and "multiple exposure".

(4-7) In the above embodiments, the image forming device 1 is described as a tandem-type color printer. However, the present invention is of course not limited to this, and may be applied to a color printer of other tandem type or a monochrome printer. Further, the effects of the present invention can be achieved when applied to a copying device incorporating a scanner, a facsimile device incorporating a communication function, or a multi-function peripheral (MFP) incorporating several such functions.

[5] Outline

To sum up, the image forming device according to at least one embodiment of the present invention is an image forming device including: a plurality of element arrays that each consist of a plurality of light emitting elements arranged in a main scanning direction, the element arrays being arranged in a sub scanning direction; a photoreceptor whose surface moves relative to the light emitting elements in the sub scanning direction; a controller that outputs a control voltage instructing a light emission amount for each of the light emitting elements; and a plurality of drivers that correspond one-to-one with the light emitting elements, and each supply a drive current to a corresponding one of the light emitting elements according to the control voltage, thus causing the light emitting element to emit light to expose the moving surface of the photoreceptor, wherein array intervals L between the element arrays in the sub scanning direction satisfy $(D/2) \times (V/F) - ((V/F) \times 0.1) \leq L \leq (D/2) \times (V/F) + ((V/F) \times 0.1)$ ... (1) where F expresses frequency of an AC noise to be superimposed on the control voltage, V expresses a system speed that is a moving speed of the surface of the photoreceptor relative to the light emitting elements, and D is an odd number.

With this configuration, each two adjacent element arrays in the sub scanning direction are opposite in phase of AC noise at an exposure time to each other. Thus, each two adjacent exposure points on each scanning line are opposite in phase of AC noise to each other. This prevents easy visual recognition of streak noise resulting from AC noise.

Also, the array intervals L may satisfy $L=(D/2) \times (V/F)$ ... (2).

Also, the number of the element arrays may be an even number.

Also, the array intervals L may be an integral multiple of line intervals Ls between main scanning lines in the sub scanning direction on the surface of the photoreceptor.

Also, the array intervals L may be not an integral multiple of line intervals Ls between main scanning lines in the sub scanning direction on the surface of the photoreceptor, and with respect to each two adjacent element arrays in the sub scanning direction among the element arrays, a downstream element array may start scanning later than an upstream element array by a time period of $(((([L/Ls]+1) \times Ls) - L)/L) \times H$ ... (3) where H expresses a main scanning period for exposing a single main scanning line.

Also, the element arrays may include two or more pairs of element arrays, two element arrays constituting each of the pairs are adjacent in the sub scanning direction and perform multiple exposure on same pixels, and the pairs each may perform the multiple exposure on different pixels.

Also, the frequency F of the AC noise may indicate a frequency of a frequency component having a highest amplitude among frequency components of the AC noise.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:
a plurality of element arrays that each consist of a plurality of light emitting elements arranged in a main scanning direction, the element arrays being arranged in a sub scanning direction;
a photoreceptor whose surface moves relative to the light emitting elements in the sub scanning direction;
a controller that outputs a control voltage instructing a light emission amount for each of the light emitting elements; and
a plurality of drivers that correspond one-to-one with the light emitting elements, and each supply a drive current to a corresponding one of the light emitting elements according to the control voltage, thus causing the light emitting element to emit light to expose the moving surface of the photoreceptor, wherein
array intervals L between the element arrays in the sub scanning direction satisfy $$(D/2) \times (V/F) - ((V/F) \times 0.1) \leq L \leq (D/2) \times (V/F) + ((V/F) \times 0.1) \qquad (1)$$

where F expresses frequency of an AC noise to be superimposed on the control voltage, V expresses a system speed that is a moving speed of the surface of the photoreceptor relative to the light emitting elements, and D is an odd number;
wherein the array intervals L satisfy $$L = (D/2) \times (V/F) \qquad (2).$$

2. The image forming device of claim 1, wherein the number of the element arrays is an even number.

3. The image forming device of claim 1, wherein the array intervals L are an integral multiple of line intervals Ls between main scanning lines in the sub scanning direction on the surface of the photoreceptor.

4. The image forming device of claim 1, wherein the array intervals L are not an integral multiple of line intervals Ls between main scanning lines in the sub scanning direction on the surface of the photoreceptor, and
with respect to each two adjacent element arrays in the sub scanning direction among the element arrays, a downstream element array starts scanning later than an upstream element array by a time period of $$(((([L/Ls]+1) \times Ls) - L)/L) \times H \qquad (3)$$

where H expresses a main scanning period for exposing a single main scanning line.

5. The image forming device of claim 1, wherein the element arrays include two or more pairs of element arrays, two element arrays constituting each of the pairs are adjacent in the sub scanning direction and perform multiple exposure on same pixels, and
the pairs each perform the multiple exposure on different pixels.

6. The image forming device of claim 1, wherein the frequency F of the AC noise indicates a frequency of a frequency component having a highest amplitude among frequency components of the AC noise.

* * * * *